United States Patent [19]

Bertanza

[11] 3,896,703
[45] July 29, 1975

[54] ARRANGEMENT FOR RELIEVING THE MECHANICAL STRESSES IN POWER ASSISTED STEERING FOR VEHICLES IN THE FULL-LOCK STEERING POSITIONS

[75] Inventor: Battista Bertanza, Segrate (Milan), Italy

[73] Assignee: Powersteering Trust Reg., Yriesenberg, Liechtenstein

[22] Filed: June 24, 1974

[21] Appl. No.: 482,718

[52] U.S. Cl................................ 91/401; 91/375 A
[51] Int. Cl............................................. F15b 15/22
[58] Field of Search........................ 91/401, 224, 49

[56] References Cited
UNITED STATES PATENTS

| | | | |
|---|---|---|---|
| 2,261,444 | 11/1941 | Neubert, Jr. | 91/401 |
| 2,394,384 | 2/1946 | Horstmann | 91/401 |
| 3,083,693 | 4/1963 | Kunz | 91/401 |
| 3,092,083 | 6/1963 | Sheppard | 91/401 |
| 3,362,211 | 1/1968 | Chirco | 91/401 |
| 3,608,433 | 9/1971 | Buisman et al. | 91/401 |

Primary Examiner—Paul E. Maslousky
Attorney, Agent, or Firm—Sughrue, Rothwell, Mion, Zinn & Macpeak

[57] ABSTRACT

For the purpose of relieving stresses in an hydraulic power assisted steering system a pair of rods project from an end wall of the hydraulic servo-actuator cylinder and are slidable sealingly in respective conduits extending completely through the piston. The rods have parts of reduced cross section which are located within the respective conduits at the opposite end of stroke positions of the piston to afford communication between opposite sides of the piston and relieve the hydraulic pressure acting thereon.

6 Claims, 5 Drawing Figures

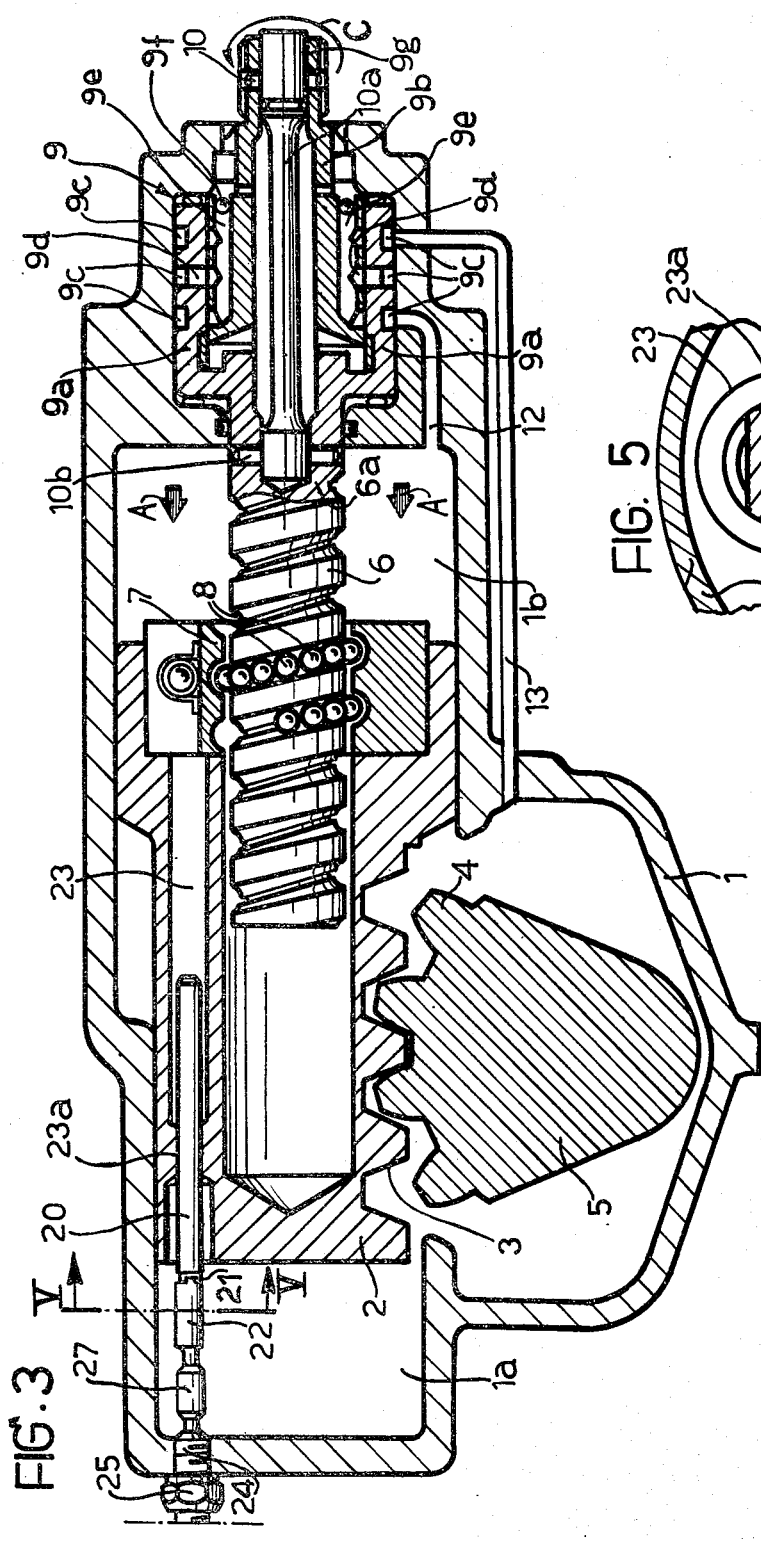
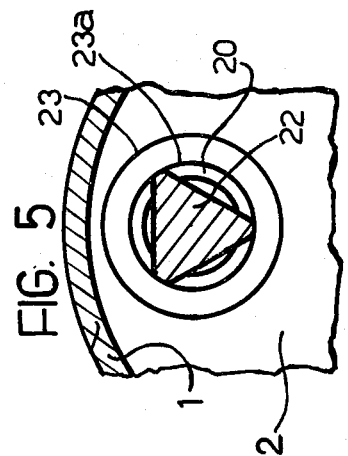
FIG. 3
FIG. 5

3,896,703

ARRANGEMENT FOR RELIEVING THE MECHANICAL STRESSES IN POWER ASSISTED STEERING FOR VEHICLES IN THE FULL-LOCK STEERING POSITIONS

BACKGROUND OF THE INVENTION

The present invention relates to an arrangement for relieving mechanical stresses in hydraulic power-assisted steering, particularly for motor vehicles, in the full-lock positions of the steering.

As is known, hydraulic power-assisted steering systems for motor vehicles generally comprise a hollow body serving as a cylinder within which there is displaceably mounted a piston having a mechanical connection which projects sealingly from the hollow body and which engages the mechanical linkage for steering the wheels of the vehicle.

The abovementioned piston delimits, within the hollow body, two chambers to which oil under pressure is supplied through a pump with interposition of an hydraulic distributor which is in turn controlled by the steering wheel. The oil under pressure is delivered to one chamber or the other according to the direction of rotation of the steering wheel, the chamber which is not under pressure being connected to a discharge outlet.

The piston is also connected, through a screw and nut mechanism, with a part of the distributor and, through the interposition of a torsion rod, is also connected to the steering column. Such connection, known in itself, makes it possible to steer the vehicle solely under manual control by acting directly on the steering linkage in the event of damage to or failure of the hydraulic distributor or the oil pump.

Power-assisted steering systems of the known type referred to above have been found to exhibit unsatisfactory behaviour during operation of the hydraulic servo system in the positions of full lock, that is, when the piston approaches and reaches the positions of maximum displacement within the hollow body which functions as a cylinder. In fact it has been found that, in such full lock positions the mechanical members connecting the piston to the steering linkage, and the feed pump for the oil under pressure, are excessively stressed due to the hydraulic thrust which continues to be exerted against the piston when the latter is practically at the end of its stroke and cannot move further.

The principal object of the present invention is to reduce the stresses on the various mechanical members connected to the piston of an hydraulic power-assisted steering system when approaching the end of stroke positions in either direction, during operation of the hydraulic servo-system.

SUMMARY OF THE INVENTION

According to the present invention there is provided an arrangement for reducing the stresses on mechanical parts of an hydraulic power-assisted steering system for motor vehicles at the full-lock steering positions during operation by hydraulic fluid, comprising a hollow body serving as an hydraulic cylinder, a piston mounted displaceably within the said hollow body and defining therein two chambers connected selectively through an hydraulic distributor to a source of fluid under pressure and to a discharge outlet, according to the steering direction, characterised in that there are provided at least two conduits traversing the piston parallel to its direction of movement, the conduits connecting the two chambers defined by the piston within the hollow body, and respective rods secured to and projecting from an end wall of the said hollow body and located slidably within the conduits, the said rods each being provided with a narrow part having a transverse cross section which is less than the internal cross section of the respective conduit whilst the remainder of each rod has a cross section equal to that of the respective conduit to seal the latter, the said narrow part in one of the said rods being positioned in its associated conduit in one end of stroke position of the piston and the said narrow part in the other of the said rods being positioned in its associated conduit in the other end of stroke position of the piston so that in these respective end of stroke positions of the piston the respective conduits are at least partially open.

BRIEF DESCRIPTION OF THE DRAWINGS

An embodiment of the invention will now be described, by way of example, with reference to the accompanying drawings, in which:

FIG. 3 is an axial section corresponding to FIG. 2 illustrating the part of the arrangement according to this invention relative to a second end-of-stroke position, taken along line III—III of FIG. 1;

FIG. 4 is a cross section taken along line IV—IV of FIG. 2, and

FIG. 5 is a cross section taken along line V—V of FIG. 3.

DETAILED DESCRIPTION OF THE ILLUSTRATED EMBODIMENT

Figure 1:
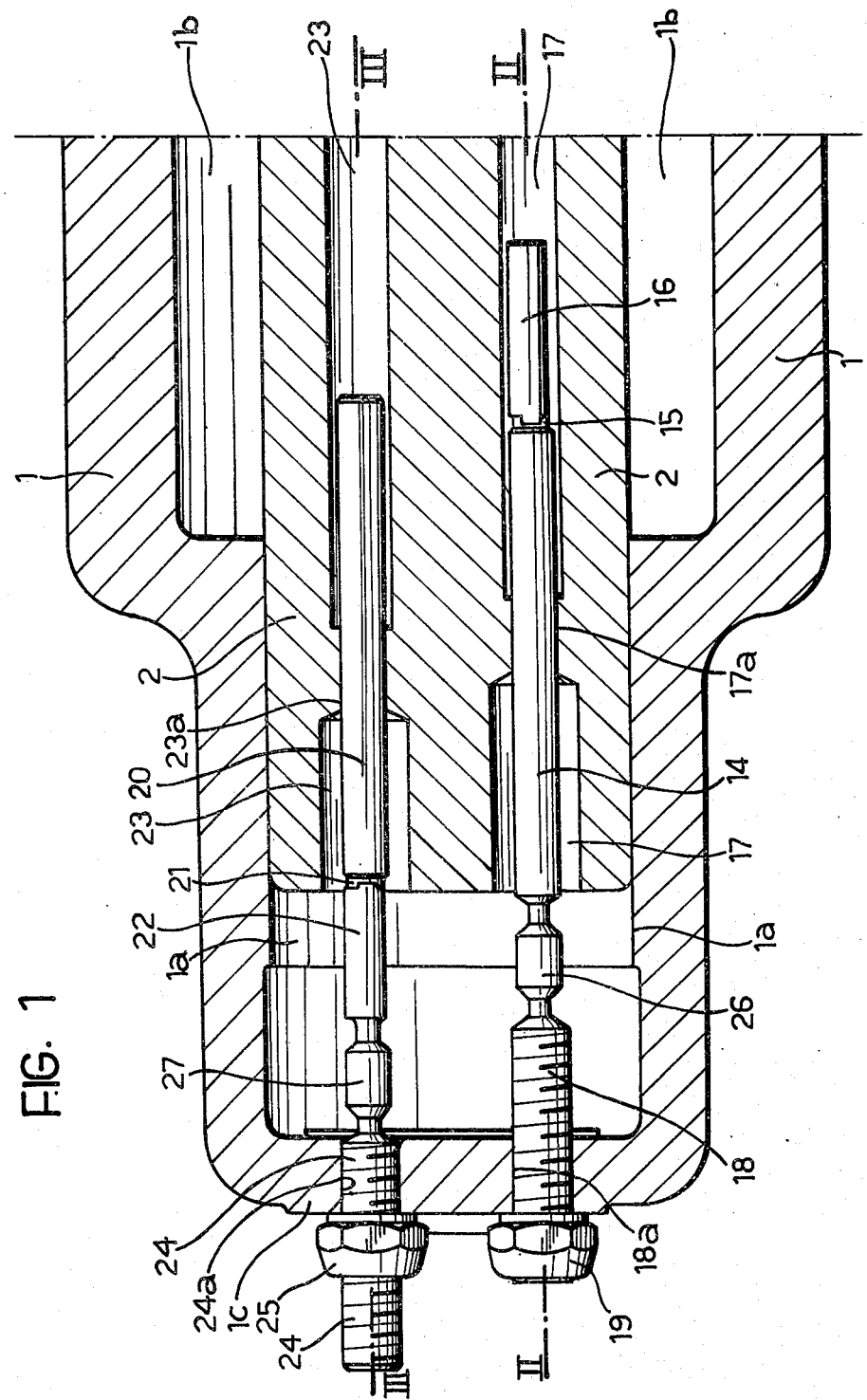
FIG. 1 is an axial sectional view on an enlarged scale, partly in section, of one part of a power-assisted steering system incorporating an arrangement according to the invention.

With reference to the drawings, reference numeral 1 indicates a hollow body which serves as an hydraulic cylinder within which a piston 2 is displaceably mounted. The piston 2 is provided along one side with a rack 3 meshing with a toothed sector 4 attached to a drive shaft 5 which projects sealingly, in a manner known per se, from the hollow body 1 and is connected to the vehicle wheel steering linkage, not shown.

The piston 2 defines within the hollow body 1 two chambers 1a and 1b to which oil under pressure may be supplied through conduits 12 and 13 respectively by way of a rotary hydraulic distributor shown generally by 9.

In accordance with known practice, the hydraulic distributor 9 is constituted by an external rotor 9a and by an internal rotor 9b located coaxially within the external rotor 9a. The internal rotor 9b projects from the hollow body 1 with an extension 9g to which the steering column (not shown) is connected.

One end (the right-hand end as viewed in FIGS. 2 and 3) of a torsion rod 10a is connected to the rotor extension 9g by means of a pin 10. The rod 10a extends axially through the hollow interior of the internal rotor 9b and its other end is connected by a transverse pin 10b to one end 6a of a screw 6. The screw 6 is in turn connected through circulating balls 8 with a nut 7 connected rigidly to the piston 2. The kinetic connection constituted by the screw 6 and nut 7 makes it possible, in a known manner, to move the piston 2 within the body 1 and thus to effect direct mechanical steering of the vehicle in the event of damage to the hydraulic feed system.

The hydraulic operation of the power-assisted steering system is ensured by a supply of oil under pressure, in manner known per se, through a pump, not shown, and channels 9c, 9d and 9e in the external and internal rotors of the hydraulic distributor 9. The reference 9f indicates small balls which, to facilitate manufacture and assembly, close the conduits 9e of the internal rotor of the distributor.

The piston 2 has first and second axially extending conduits 17, 23 which traverse the piston 2 completely and which communicate both with the chamber 1a and the chamber 1b of the hollow body 1. The conduits 17 and 23 each have a section 17a and 23a respectively having a predetermined internal diameter less than the diameter of the remainder of the conduit.

Rods 14 and 20 are connected to the end wall 1c of the hollow body 1 by means of respective threaded rods 18 and 24 which engage in respective threaded orifices 18a and 24a in the end wall 1c and are locked by nuts 19 and 25 which ensure the secure fixing of the said threaded rods 18 and 24 in desired positions with respect to the wall 1c.

The rods 14 and 20 are connected to the respective threaded rods 18 and 24 through respective spherical swivel joints 26, 27 known per se, of which only the outer casings are shown. The spherical swivel joints 26 and 27 permit necessary displacements of the rods 14 and 20 to adapt themselves to the axial displacement of the piston 2 without any of the parts siezing-up.

The rod 14 is provided with a part 16 of triangular cross section (FIG. 4) separated from the remainder of the same rod by an annular channel 15. The triangular section part 16 has a circumscribing circle the diameter of which is equal to the diameter of the remainder of the rod 14 and is also equal to the internal diameter of the section 17a of the conduit 17.

In analogous manner the rod 20 is provided with a part 22 having a triangular cross section separated from the rest of the rod 20 by an annular circumferential groove 21. The triangular section part 22 has a circumscribing circle the diameter of which is equal to the diameter of the rod 20 and to that of the section 23a of the conduit 23.

The part 16 of triangular section of the rod 14 is positioned at the right-hand end, as viewed in the drawings, of the rod 14, whilst the part 22 of triangular section of the rod 20 is positioned at the left-hand end of the rod 20.

The operation of the arrangement will be apparent from the preceding description.

Figure 2:
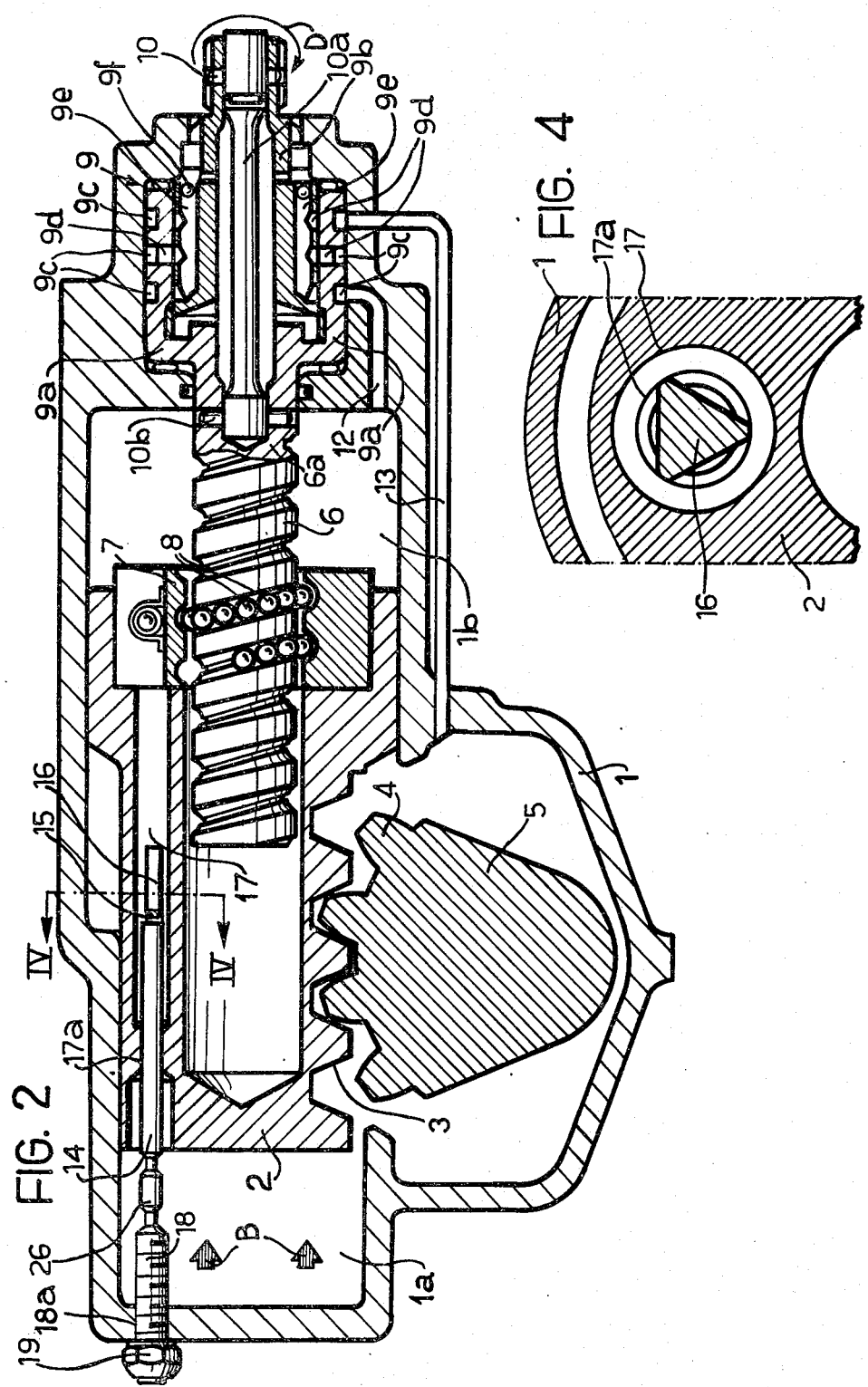
FIG. 2 is an axial section illustrating a part of the arrangement according to this invention relative to a first end-of-stroke position, taken along line II—II of FIG. 1.

Thus upon rotation of the steering wheel, for example in the direction of the arrow D of FIG. 2, oil is passed under pressure through the distributor 9 into the chamber 1a in the hollow body 1, and the piston 2 is displaced to the right, in the direction of the arrow B, to cause steering deflection of the wheels in the corresponding direction.

Upon displacement of the piston 2 in direction of the arrow B the conduits 17 and 23 are closed in correspondence with the sections 17a and 23a inasmuch as such sections are sealingly obstructed by the full section of the respective rods 14 and 20. No communication between the chamber 1a and the chamber 1b is therefore permitted.

When, however, the piston 2 reaches the extreme right-hand end of its stroke, as viewed in the drawings, corresponding to a full lock position of the steering wheel, the chamber 1a, which is under pressure, is connected to the chamber 1b which is connected to the discharge outlet, through the part 16 of the triangular section of the rod 14, which is brought into correspondence with the section 17a of the conduit 17. Since the length of the triangular section part 16 of the rod 14 is greater than the length of the conduit section 17a partial, that is, restricted, communication is established through the conduit 17 between the chamber 1a and the chamber 1b. Oil under pressure therefore flows through the conduit 17 from the chamber 1a under pressure towards the chamber 1b connected to the discharge outlet, thereby reducing the stresses on the piston 2 and on the mechanical members connected thereto.

Similarly, upon steering in the opposite direction, as shown by the arrow C in FIG. 3, the piston 2 will be moved to the left as viewed in the drawings. The chamber under pressure will then be the chamber 1b and the chamber 1a will be connected to the discharge outlet. At intermediate steering angles upon movement of the piston 2 to the left, that is, in the direction shown by the arrows A in FIG. 3, there will be no communication between the chamber 1b under pressure and the chamber 1a connected to the discharge outlet inasmuch as the rods 14 and 20 sealingly obstruct the whole cross section of the conduit sections 17a and 23a, the length of each circular cross section portion of the rods 14 and 20 being at least equal to the stroke of the piston 2. At full lock in the direction of steering shaft rotation indicated by arrow C, the piston 2 reaches the position of maximum displacement in direction of the arrows A and the part 22 of triangular cross section, even though guided within the conduit 23a, will then allow communication between the chamber 1b and the chamber 1a so that oil under pressure passes from the chamber 1b towards the chamber 1a connected to the discharge outlet. This again results in a relief of the stresses on the piston 2 and on the mechanical members connected thereto.

The presence of the threaded rods 18 and 24 to which the rods 14 and 20 are connected allows adjustment of the exact position of the respective narrow parts 16, 22 of triangular cross section with respect to the stroke of the piston 2. Thus it is possible to effect regulation of the moment at which the connection between the chambers 1a and 1b is established in each steering direction, to ensure that the stresses upon the piston 2 are relieved at each end of the stroke of the piston.

What is claimed is:

1. An arrangement for reducing the stresses on mechanical parts of an hydraulic power-assisted steering system for motor vehicles at the full-lock steering positions during hydraulic operation, comprising a hollow body defining an hydraulic cylinder having an end wall, a piston mounted displaceably within the said cylinder and defining therein two chambers, and hydraulic distributor means responsive to the steering direction for connecting said chambers selectively to a source of fluid under pressure and to a discharge outlet, wherein the improvement consists in the provision of at least two conduits traversing the piston parallel to its direction of movement, said conduits connecting the two chambers defined by the piston within the hollow body, respective rods secured to and projecting from said end wall, said rods being slidably located within the conduits, the said rods each having a narrow part the transverse cross section of which is less than the internal cross section of the respective conduit whilst the remainder of each rod has a cross section equal to that of the respective conduit to seal the latter, the said narrow part on one of the said rods being positioned on its associated conduit in one end of stroke position of the piston and the narrow part in the other of the said rods being positioned in its associated conduit in the other end of stroke position of the piston whereby in these respective end of stroke positions of the piston the respective conduits are at least partially open.

2. The arrangement defined in claim 1, including swivel joints connecting each of said rods to the end wall of the said hollow body.

3. The arrangement defined in claim 1, wherein said narrow parts of the rods have triangular cross sections.

4. The arrangement as defined in claim 3, wherein the length of each of the parts of triangular cross section of the said rods is greater than the length of the respective conduit in the said piston within which the rods are slidably mounted.

5. The arrangement defined in claim 1, wherein the length of that part of each of the rods having a cross section equal to the internal section of the respective conduits in the piston is at least equal to the maximum stroke of the piston.

6. The arrangement defined in claim 3, wherein the triangular cross section of the narrow part of each rod has a circumscribing circle of diameter equal to the diameter of the respective conduit in the piston.

* * * * *